(12) United States Patent
Noguchi et al.

(10) Patent No.: US 7,975,546 B2
(45) Date of Patent: Jul. 12, 2011

(54) ANGULAR VELOCITY SENSOR AND ANGULAR VELOCITY SENSING DEVICE

(75) Inventors: Takao Noguchi, Tokyo (JP); Kenichi Tochi, Tokyo (JP); Ken Unno, Tokyo (JP); Tatsuo Namikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 735 days.

(21) Appl. No.: 12/004,069

(22) Filed: Dec. 20, 2007

(65) Prior Publication Data
US 2008/0148848 A1 Jun. 26, 2008

(30) Foreign Application Priority Data
Dec. 25, 2006 (JP) .................................. 2006-348221

(51) Int. Cl.
*G01P 3/44* (2006.01)
(52) U.S. Cl. .................................. 73/504.16; 73/514.02
(58) Field of Classification Search ............... 73/504.16, 73/504.02, 504.03, 504.14, 514.01, 514.02, 73/514.32
See application file for complete search history.

(56) References Cited

U.S. PATENT DOCUMENTS

| | | | | |
|---|---|---|---|---|
| 5,166,571 A * | 11/1992 | Konno et al. | .................. | 310/333 |
| 5,251,483 A * | 10/1993 | Soderkvist | .................. | 73/504.16 |
| 5,396,144 A * | 3/1995 | Gupta et al. | .................. | 310/370 |
| 6,119,518 A * | 9/2000 | Itou et al. | .................. | 73/504.16 |
| 6,119,519 A * | 9/2000 | Konno et al. | .................. | 73/504.16 |
| 6,205,857 B1 * | 3/2001 | Nakajima | .................. | 73/504.16 |
| 6,490,925 B2 * | 12/2002 | Inoue et al. | .................. | 73/504.16 |
| 6,651,498 B1 * | 11/2003 | Kikuchi et al. | .................. | 73/504.12 |
| 6,698,292 B2 * | 3/2004 | Kikuchi | .................. | 73/662 |
| 6,701,785 B2 * | 3/2004 | Knowles et al. | .................. | 73/504.16 |
| 6,747,393 B2 * | 6/2004 | Kikuchi et al. | .................. | 310/321 |
| 6,865,945 B2 * | 3/2005 | Hayashi et al. | .................. | 73/504.16 |
| 6,903,618 B2 * | 6/2005 | Kawashima | .................. | 331/158 |
| 7,043,986 B2 * | 5/2006 | Kikuchi et al. | .................. | 73/504.12 |
| 7,069,783 B2 * | 7/2006 | Uehara | .................. | 73/514.12 |
| 7,210,350 B2 * | 5/2007 | Ogura | .................. | 73/504.12 |
| 7,216,540 B2 * | 5/2007 | Inoue et al. | .................. | 73/504.16 |
| 7,246,520 B2 * | 7/2007 | Eguchi et al. | .................. | 73/504.16 |
| 7,363,815 B2 * | 4/2008 | Ohuchi et al. | .................. | 73/504.16 |
| 7,714,486 B2 * | 5/2010 | Tochi et al. | .................. | 310/370 |
| 2001/0010173 A1 * | 8/2001 | Inoue et al. | .................. | 73/504.16 |
| 2003/0029239 A1 * | 2/2003 | Hatanaka et al. | .................. | 73/504.16 |
| 2004/0187574 A1 * | 9/2004 | Hayashi et al. | .................. | 73/514.16 |
| 2004/0263027 A1 * | 12/2004 | Kawashima | .................. | 310/361 |
| 2005/0088250 A1 * | 4/2005 | Matsudo et al. | .................. | 331/154 |

(Continued)

FOREIGN PATENT DOCUMENTS
JP A 8-128833 5/1996
(Continued)

*Primary Examiner* — Hezron Williams
*Assistant Examiner* — Samir M Shah
(74) *Attorney, Agent, or Firm* — Oliff & Berridge, PLC

(57) ABSTRACT

An angular velocity sensor of a horizontally located type, which can easily remove the translational acceleration influence thereto from the lateral direction, is provided. It includes a fixed portion fixed to the surface of a sensor element supporting portion of a casing, an upper detection arm and a lower detection arm, each of them being connected to the fixed portion on sides opposite to each other and extending along a plane parallel to the surface place of the sensor element supporting portion, and a pair of upper vibration arms connected to the fixed portion in such a manner as to form a pair of arms with the upper detection arm in between and extending in a direction parallel to the extending direction of the upper detection arm.

2 Claims, 13 Drawing Sheets

U.S. PATENT DOCUMENTS

| | | | |
|---|---|---|---|
| 2005/0178202 A1* | 8/2005 | Uehara | 73/497 |
| 2006/0226741 A1* | 10/2006 | Ogura et al. | 310/366 |
| 2007/0075611 A1* | 4/2007 | Kawashima | 310/361 |
| 2008/0134781 A1* | 6/2008 | Noguchi et al. | 73/504.15 |
| 2008/0148848 A1* | 6/2008 | Noguchi et al. | 73/504.16 |
| 2008/0236281 A1* | 10/2008 | Noguchi et al. | 73/504.16 |
| 2009/0039739 A1* | 2/2009 | Tochi et al. | 310/370 |
| 2009/0165554 A1* | 7/2009 | Noguchi et al. | 73/504.12 |

FOREIGN PATENT DOCUMENTS

| | | |
|---|---|---|
| JP | A 2003-227719 | 8/2003 |
| JP | A 2004-333460 | 11/2004 |

* cited by examiner

ANGULAR VELOCITY SENSOR AND ANGULAR VELOCITY SENSING DEVICE

CROSS REFERENCE TO RELATED APPLICATIONS

The present invention contains subject matter related to Japanese Patent Application JP2006-348221 filed in the Japanese Patent Office on Dec. 25, 2006, the entire contents of which being incorporated herein by reference.

BACKGROUND OF THE INVENTION

1. Field of the Invention

The present invention relates to an angular velocity sensor for detecting an angular velocity of an object and an angular velocity sensing device including the same.

2. Description of the Related Art

Although angular velocity sensors have been used for technologies to autonomously control the position of a vessel, an aircraft, a rocket, etc. in the past, recently they are also mounted in small electronic equipments such as a car-navigation system, a digital camera, a video camera, and a cellular phone. Accordingly, more compact and lower (thin-shaped) angular velocity sensors are required. Thus an angular velocity sensor of a horizontally located type, of which its longitudinal direction is orthogonal to the vertical direction, has been proposed in Japanese Laid-Open Patent Publication No. 8-128833 and Japanese Laid-Open Patent Publication No. 2004-333460 and so on instead of the angular velocity sensor of the related art which its longitudinal direction (the direction of the detection axis) is parallel to the vertical direction as proposed in Japanese Laid-Open Patent Publication No. 2003-227719.

SUMMARY OF THE INVENTION

However, in the above described arts of Japanese Laid-Open Patent Publication No. 8-128833 and Japanese Laid-Open Patent Publication No. 2004-333460, when the angular velocity sensor is subject to translational acceleration from its lateral direction (namely, a direction orthogonal to the longitudinal direction thereof within the horizontal plane), it is difficult to determine whether vibration in a detection arm is caused by the angular velocity due to rotation of an object, or caused by acceleration applied from its lateral direction.

The present invention has been devised in view of the above problem, and it is desirable to provide an angular velocity sensor of a horizontally located type, being able to easily remove the influence of the acceleration in the lateral direction and an angular velocity sensing device including the same.

An angular velocity sensor according to an embodiment of the present invention includes a fixed portion fixed to a support surface, a first upper vibration arm connected to one side of the fixed portion and extending along a plane parallel to the support surface, a lower vibration arm connected to the other side of the fixed portion and extending along the plane parallel to the support surface, and a second upper vibration arm and a third upper vibration arm each directly or indirectly connected to the fixed portion in such a manner as to form a pair of arms with the first upper vibration arm in between and respectively extending along the plane parallel to the support surface in the same direction where the first upper vibration arm extends. It is to be noted that "connected" represents a concept including such manners as being joined mechanically, being integrally formed, or being directly/indirectly connected.

An angular velocity sensing device of an embodiment of the present invention includes the above-mentioned angular velocity sensor and an integrated circuit element, and the integrated circuit element transmits a driving signal to the second upper vibration arm and the third upper vibration arm and also receives a detection signal outputted from the first upper vibration arm and the lower vibration arm.

According to the angular velocity sensor and the angular velocity sensing device of an embodiment of the present invention, since the lower vibration arm is arranged on a side opposite to the first, second and third upper vibration arms and extending in a direction opposite thereto, it is easy to discriminate the Coriolis-based vibrations from vibrations caused by acceleration applied from a lateral direction, in the first upper vibration arm and in the lower vibration arm.

Preferably, the angular velocity sensor may include a pair of connection arms that are connected to the fixed portion and extending along the plane parallel to the support surface so that the second upper vibration arm may be connected indirectly to the fixed portion via one of the pair of connection arms and the third upper vibration arm may be indirectly connected to the fixed portion via the other of the pair of connection arms.

Preferably, the first upper vibration arm, the second upper vibration arm, the third upper vibration arm and the lower vibration arm may be configured to extend in directions parallel to each other. Preferably, the second upper vibration arm and the third upper vibration arm may be configured to extend symmetrically with respect to the first upper vibration arm.

Preferably, the angular velocity sensor may include a pair of first upper electrodes formed on the first upper vibration arm and arranged side by side along a width direction of the first upper vibration arm, a pair of lower electrodes that are formed on the lower vibration arm to be arranged side by side along a width direction of the lower vibration arm, a pair of second upper electrodes formed on the second upper vibration arm to be arranged side by side along a width direction of the second upper vibration arm, and a pair of third upper electrodes formed on the third upper vibration arm to be arranged side by side along a width direction of the third upper vibration arm.

Preferably, when the pair of connection arms are provided as described above, the angular velocity sensor may include either (1) or (2) as follows:

(1) a pair of first upper electrodes formed on the first upper vibration arm to be arranged side by side along a width direction of the first upper vibration arm, a pair of lower electrodes formed on the lower vibration arm to be arranged side by side along a width direction of the lower vibration arm, a pair of fourth upper electrodes formed on one of the pair of connection arms to be arranged side by side along a width direction of the one of the pair of connection arms, and a pair of fifth upper electrodes formed on the other of the pair of connection arms to be arranged side by side along a width direction of the other of the pair of connection arms;

(2) a pair of first upper electrodes formed on the first upper vibration arm to be arranged side by side along a width direction of the first upper vibration arm, a pair of lower electrodes formed on the lower vibration arm to be arranged side by side along a width direction of the lower vibration arm, a pair of second upper electrodes formed on the second upper vibration arm to be arranged side by side along a width direction of the second upper vibration arm, a pair of third upper electrodes formed on the third upper vibration arm to be arranged side by side along a width direction of the third upper vibration arm, a pair of fourth upper electrodes formed on one of the pair of connection arms to be arranged side by side along a width direction of one of the pair of connection arms, and a pair of fifth upper electrodes formed on the other of the pair of connection arms to be arranged side by side along a width direction of the other of the pair of connection arms.

Effects of the Invention

In the angular velocity sensor and angular velocity sensing device according to embodiments of the present invention, which is a horizontally located type, since the lower vibration arm is configured on a side opposite to the first, second and third upper vibration arms so as to extend in a direction opposite thereto, it is easy to discriminate the Coriolis-based vibrations from vibrations caused by translational acceleration applied from a lateral direction in the first upper vibration arm and in the lower vibration arm. Thus the influence of translational acceleration applied from the lateral direction can be easily removed.

When the angular velocity sensor includes the pair of connection arms that are connected to the fixed portion and extending along the plane parallel to the support surface so that the second upper vibration arm may be indirectly connected to the fixed portion via one of the pair of connection arms and the third upper vibration arm may be indirectly connected to the fixed portion via the other of the pair of connection arms, the generated Coriolis force can be applied as a greater moment to the first upper vibration arm and the lower vibration arm, thus comparatively increasing the amplitude of vibrations of both of the first upper detection arm and the lower vibration arm. As a result, the detecting accuracy of the angular velocity improves.

In addition, when the first upper vibration arm, the second upper vibration arm, the third upper vibration arm and the lower vibration arm are configured to extend in directions parallel to each other, the greatest moment is obtainable from the Coriolis force thereby further improving the detecting accuracy.

When the second upper vibration arm and the third upper vibration arm are configured to extend symmetrically with respect to the first upper vibration arm, symmetrical drive vibrations are generated therebetween more easily. As a result, it becomes possible to simplify a configuration of a drive circuit for driving each of the second/third upper vibration arms and to reduce the generation of unnecessary vibrations that would be generated in the first upper vibration arm and the lower vibration arm.

In the case where the pair of connection arms are provided as described above, when the angular velocity sensor includes a pair of first upper electrodes formed on the first upper vibration arm to be arranged side by side along a width direction of the first upper vibration arm, a pair of lower electrodes formed on the lower vibration arm to be arranged side by side along a width direction of the lower vibration arm, a pair of second upper electrodes formed on the second upper vibration arm to be arranged side by side along a width direction of the second upper vibration arm, a pair of third upper electrodes formed on the third upper vibration arm to be arranged side by side along a width direction of the third upper vibration arm, and a pair of fourth upper electrodes formed on one of the pair of connection arms to be arranged side by side along a width direction of the one of the pair of connection arms, and a pair of fifth upper electrodes formed on the other of the pair of connection arms to be arranged side by side along a width direction of the other of the pair of connection arms, it becomes possible not only to detect the angular velocity but also detect the direction and magnitude of acceleration from the longitudinal direction (width direction of the connection arms). In this manner, Coriolis-based vibrations are discriminable more easily from vibrations induced by the acceleration applied from the longitudinal direction even if amplitudes of the vibrations in the first upper vibration arm and the lower detection arm are affected and changed by the vibration generated in the pair of connection arms due to the longitudinally-applied acceleration. Thus the influence of acceleration applied from the longitudinal direction can be easily removed.

Other and further objects, features and advantages of the invention will appear more fully from the following description.

DESCRIPTION OF THE PREFERRED EMBODIMENTS

Embodiments of the present invention will be described in detail hereinbelow with reference to the drawings.

Configuration of an angular velocity sensing device 1 according to one embodiment of the present invention will be described hereinbelow with reference to FIGS. 1 to 6.

Figure 1:
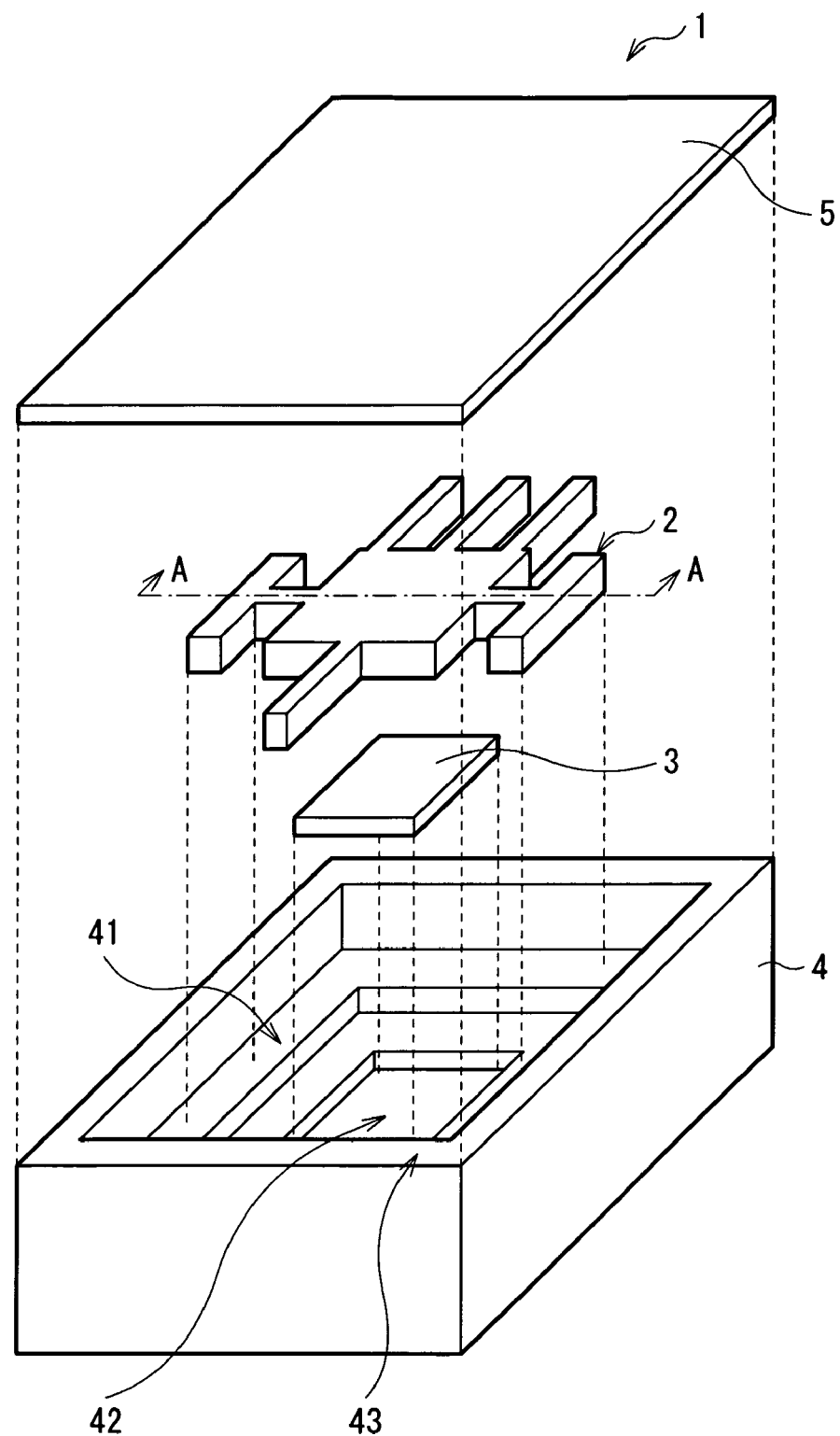
FIG. 1 is an exploded perspective view showing an angular velocity sensing device according to one embodiment of the present invention.
Figure 2:
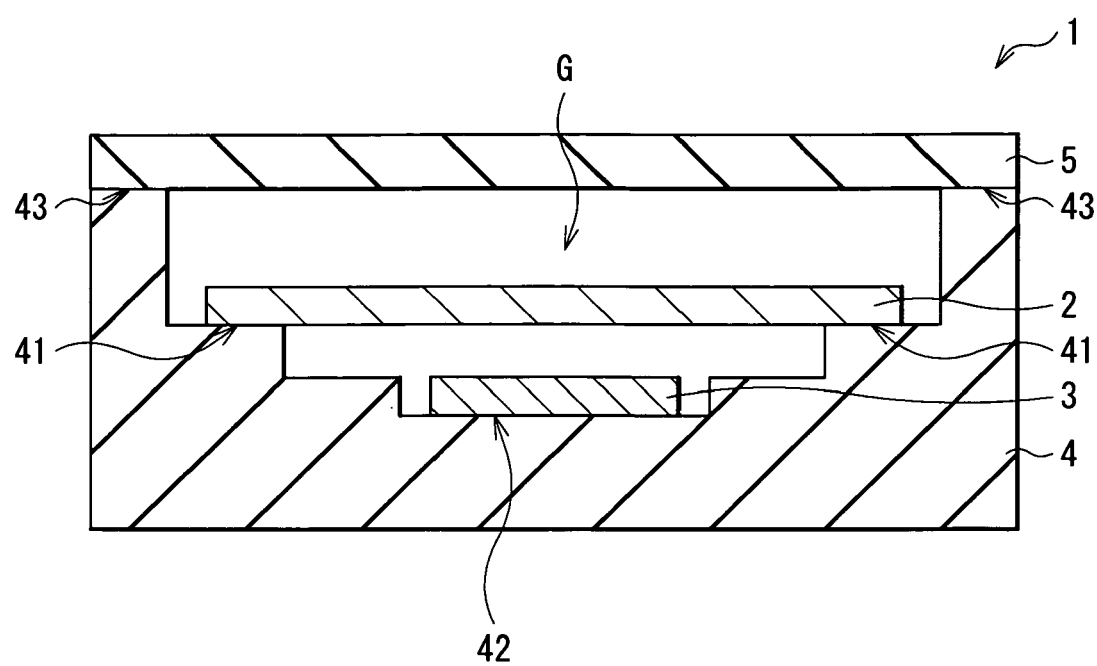
FIG. 2 is a cross sectional view showing a configuration taken along the line A-A of FIG. 1, as seen from the direction indicated by the arrows.

FIG. 1 is a perspective view showing a disassembled internal configuration of the angular velocity sensing device 1 according to the embodiment. FIG. 2 is a sectional view showing a cross-sectional configuration of the angular velocity sensing device 1 taken along the line A-A thereof, as seen from the direction indicated by the arrows. The angular velocity sensing device 1 includes an angular velocity sensor 2 and an integrated circuit element 3 disposed in an internal space G (refer to FIG. 2) formed by being surrounded by a casing 4 and a top-cover section 5, both of which being fit into each other.

The integrated circuit element 3 transmits a driving signal to each piezoelectric element provided in each drive arm of the angular velocity sensor 2 and also receives a detection signal outputted from each piezoelectric element provided in each detection arm of the angular velocity sensor 2, as described later. The casing 4 is formed typically by layering a plurality of ceramic thin plates so as to have a step-like cavity therein having a plurality of layers, so that it can house both of the angular velocity sensor 2 and the integrated circuit element 3 in each of the layers. The top-cover section 5 is typically formed of the same ceramic material as that of the casing 4.

As shown in FIG. 1, an integrated circuit supporting portion 42 of an annular shape is formed in the deepest layer of the cavity in the casing 4, and the integrated circuit element 3 is disposed thereon. A sensor element supporting portion 41 (support surface) of an annular shape is formed in the periphery of the integrated circuit supporting portion 42, in a layer shallower (upper) than that of the integrated circuit supporting portion 42, and angular velocity sensor 2 is disposed on the sensor element supporting portion 41 like a simple beam supported at both ends. In addition, a top-cover section supporting portion 43 of an annular shape, which is an outer edge of the whole cavity is formed in the periphery of the sensor element supporting portion 41. The top-cover section supporting portion 43 and the top-cover section 5 are fit into each other to seal the cavity of the casing 4 from the outside, thereby forming the internal space G (refer to FIG. 2).

The angular velocity sensor 2 is formed along a plane parallel to a top surface of the sensor element supporting portion 41 of the casing 4, as shown in FIGS. 1 and 2. That is, the angular velocity sensor 2 herein has a configuration of what is called a horizontally located type.

Figure 3:
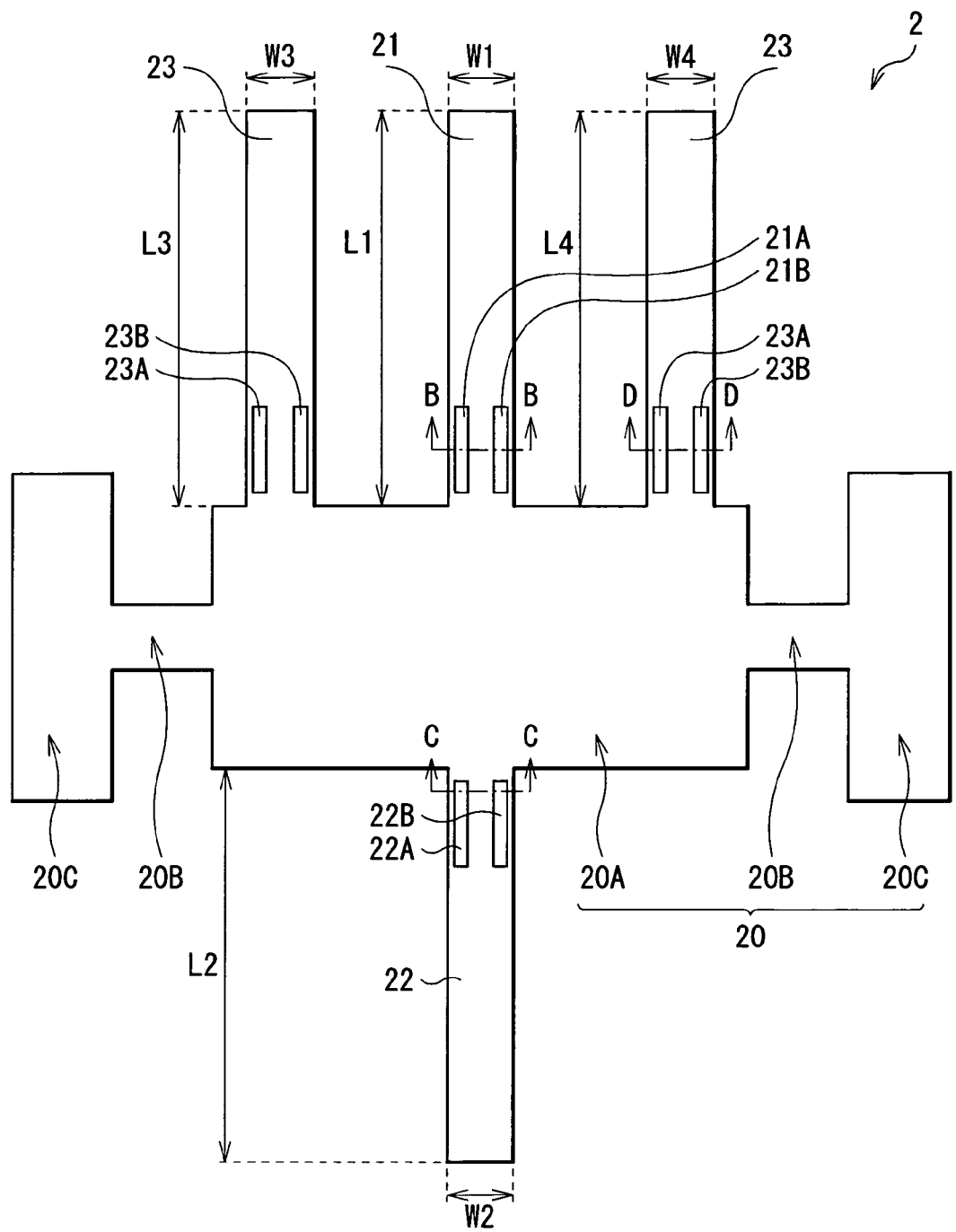
FIG. 3 is a top surface block diagram showing an angular velocity sensor of FIG. 1.
Figure 4:
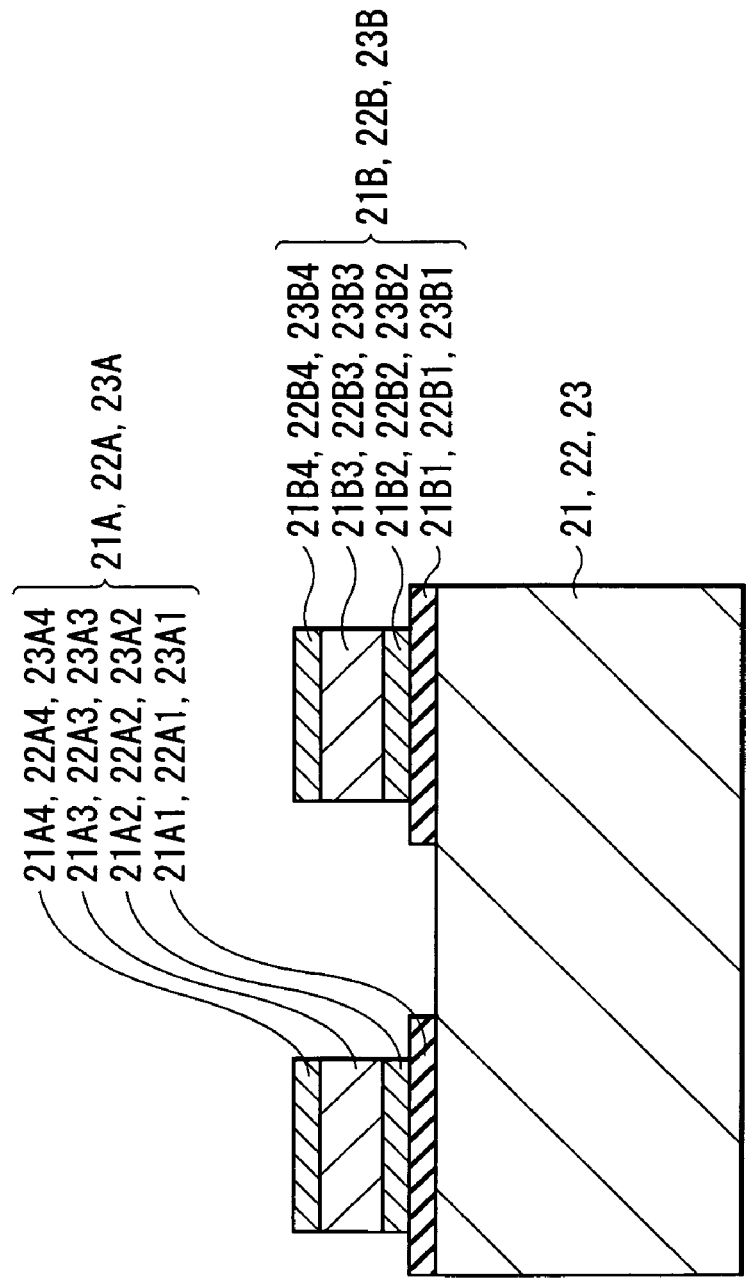
FIG. 4 is a cross sectional view showing a configuration taken along the lines B-B, C-C and D-D of FIG. 3, as seen from the direction indicated by the arrows.

FIG. 3 is a plan view showing a top surface configuration of the angular velocity sensor 2, and FIG. 4 is a sectional view collectively showing examples of the cross-sectional configurations taken along the lines B-B, C-C and D-D of FIG. 3 seen from the directions indicated by the arrows. The angular velocity sensor 2 includes a fixed portion 20 that is fixed to the sensor element supporting portion 41, an upper detection arm 21 (a first upper vibration arm) and a lower detection arm 22 (a lower vibration arm) respectively connected to the both sides (in this case, upper side and lower side on the paper of FIG. 3) of the fixed portion 20, and a pair of upper drive arms 23 (a second upper vibration arm and a third upper vibration arm) respectively connected to the fixed portion 20 with the upper detection arm 21 in between.

Here, the word "upper", which is included in each of the names "upper detection arm 21" and "upper drive arms 23" indicates an upper direction with respect to a symmetry axis passing through the center of the fixed portion 20 on the paper of FIG. 3, which is used just for convenience, thereby never meaning any height directions. Similarly, the word "lower", which is included in the name "lower detection arm 22" indicates a lower direction with respect to the symmetry axis passing through the center of the fixed portion 20 on the paper of FIG. 3, which is used just for convenience, thereby never meaning any height directions.

The fixed portion 20 has a function of floating the upper detection arm 21, the lower detection arm 22, and the pair of upper drive arms 23 inside the internal space G. The fixed portion 20 includes a fixed center section 20A of a rectangular shape provided in the center portion of the angular velocity sensor 2, and a pair of fixed beam sections 20B are connected to the both sides (herein representing the right-hand side and the left-hand side on the paper of FIG. 3) of the fixed center section 20A. Each of the fixed beam sections 20B has a long and slender configuration and extends in a direction orthogonal to an extending direction of the upper detection arm 21 and the lower detection arm 22. In addition, a pair of fixed end portions 20C are respectively connected to the ends of the pair of fixed beam sections 20B in such a manner as to sandwich the fixed center section 20A therebetween via the pair of fixed beam sections 20B. Each of the fixed end portions 20C has a long and slender configuration and extends in the extending direction of the upper detection arm 21 and the lower detection arm 22. The center portion of each of the fixed end portions 20C is connected to the end of each of the fixed beam portions 20B, and the base portion of each of the fixed end portions 20C is in contact with the top face of the sensor element supporting portion 41 of the casing 4. With such arrangement, the fixed center section 20A and the fixed beam sections 20B are held inside the internal space G by the fixed end portions 20C, in a floating state.

It is to be noted that the configuration and size of the fixed portion 20 is not limited to those exemplified in FIG. 3, and any kind of configuration and size is available as long as configured to float the upper detection arm 21, the lower detection arm 22 and the pair of upper drive arms 23 inside the internal space G.

The upper detection arm 21 and the lower detection arm 22 generate a vibration in accordance with the magnitude of a distortion of the fixed center section 20A when the distortion thereof generated by the application of the Coriolis force to the pair of upper drive arms 23 has been transmitted to the upper detection arm 21 and the lower detection arm 22. The upper detection arm 21 is connected to one side (herein the upper side thereof on the paper of FIG. 3) of the fixed center section 20A, and extending away therefrom along a plane parallel to a top surface of the sensor element supporting portion 41. On the other hand, the lower detection arm 22 is connected to the other side of the fixed center section 20A on a side opposite to the upper detection arm 21, and extending away therefrom along a plane parallel to a top surface of the sensor element supporting portion 41.

Although it is preferred that both of the upper detection arm 21 and the lower detection arm 22 extend in a direction parallel to each other, they may be extending in mutually intersecting directions with a given angle. It is also preferred that the upper detection arm 21 and the lower detection arm 22 are configured to extend symmetrical with respect to a line passing through the fixed center section 20A and extending orthogonal to the extending direction of the upper detection arm 21. However, other configurations are allowable.

The upper drive arm 23 generates the Coriolis force thereon when an object, which is equipped with the angular velocity sensing device 1 thereupon, rotates with respect to a rotation axis extending in a direction orthogonal to the hypothetical plane including the sensor element supporting portion 41 (herein representing a direction orthogonal to the face of the paper of FIG. 3). Each of the upper drive arms 23 is connected to the fixed center sections 20A on the side connected to the upper detection arm 21 (herein representing the upper portion on the paper of FIG. 3), and extending along a plane parallel to a top surface of the sensor element supporting portion 41, away from the fixed center section 20A. Each of the upper drive arms 23 is disposed separately from the upper detection arm 21 to an extent so as not to collide with each other when they are all vibrating simultaneously.

It is preferred that the upper drive arms 23 extend in a direction parallel to each other, but they may extend in mutually intersecting directions with a given angle. It is also preferred that each of the upper drive arms 23 is formed to extend symmetrically with respect to the upper detection arm 21( ), but they may not be necessarily formed in such a manner. It is also preferred that the upper detection arm 21, the lower detection arm 22, and the pair of upper drive arms 23 extend in a direction parallel to each other, they may extend in mutually intersecting directions with a given angle.

Here, the upper detection arm 21, the lower detection arm 22, and the pair of upper drive arms 23 can be typically made of a common material such as silicon and may be produced through bulk formation by patterning a wafer.

A pair of piezoelectric elements 21A and 21B (first upper electrodes) are formed upon the face of the upper detection arm 21 in such a manner as to extend in a direction parallel to the extending direction of the upper detection arm 21. The pairs of piezoelectric elements 21A and 21B have a function of detecting a vibration of the upper detection arm 21 when it vibrates along the plane parallel to the plane including the sensor element supporting portion 41 of the casing 4. It is preferred that the pairs of piezoelectric elements 21A and 21B are arranged side by side along a width direction of the upper detection arm 21.

A pair of piezoelectric elements 22A and 22B (lower electrodes) are formed upon the face of the lower detection arm 22 in such a manner as to extend in a direction parallel to the extending direction of the lower detection arm 22. As with the pair of piezoelectric elements 21A and 21B, the pair of piezoelectric elements 22A and 22B have a function of detecting a vibration of the lower detection arm 22 when it vibrates along the plane parallel to the plane including the sensor element supporting portion 41 of the casing 4. It is preferred that the pairs of piezoelectric elements 22A and 22B are arranged side by side along a width direction of the lower detection arm 22.

A pair of piezoelectric elements 23A and 23B second and third upper electrodes are formed upon the face of each of the upper drive arms 23 in such a manner as to extend in a direction parallel to an extending direction of the upper drive arms 23. The pairs of piezoelectric elements 23A and 23B have a function of vibrating each of the upper drive arms 23 along the plane parallel to the plane including the sensor element supporting portion 41 of the casing 4, and preferably they are arranged side by side along a width direction of each of the upper drive arms 23.

Here, each of the piezoelectric elements 21A, 22A, and 23A are typically formed by layering insulating layers 21A1, 22A1 and 23A1, lower electrodes 21A2, 22A2 and 23A2, piezoelectric crystals 21A3, 22A3 and 23A3, and upper part electrodes 21A4, 22A4 and 23A4 in this order on the upper detection arm 21, the lower detection arm 22, and the upper drive arms 23 respectively, as shown in FIG. 4. On the other hand, each of the piezoelectric elements 21B, 22B and 23B are formed by layering insulating layers 21B1, 22B1 and 23B1, lower electrodes 21B2, 22B2 and 23B2, piezoelectric crystals 21B3, 22B3 and 23B3, and upper part electrodes 21B4, 22B4 and 23B4 in this order on the upper detection arm 21, the lower detection arm 22, and the upper drive arms 23 respectively, as shown in FIG. 4. That is, piezoelectric elements 21A, 22A and 23A and piezoelectric elements 21B, 22B and 23B are formed independently of each other.

Figure 5:
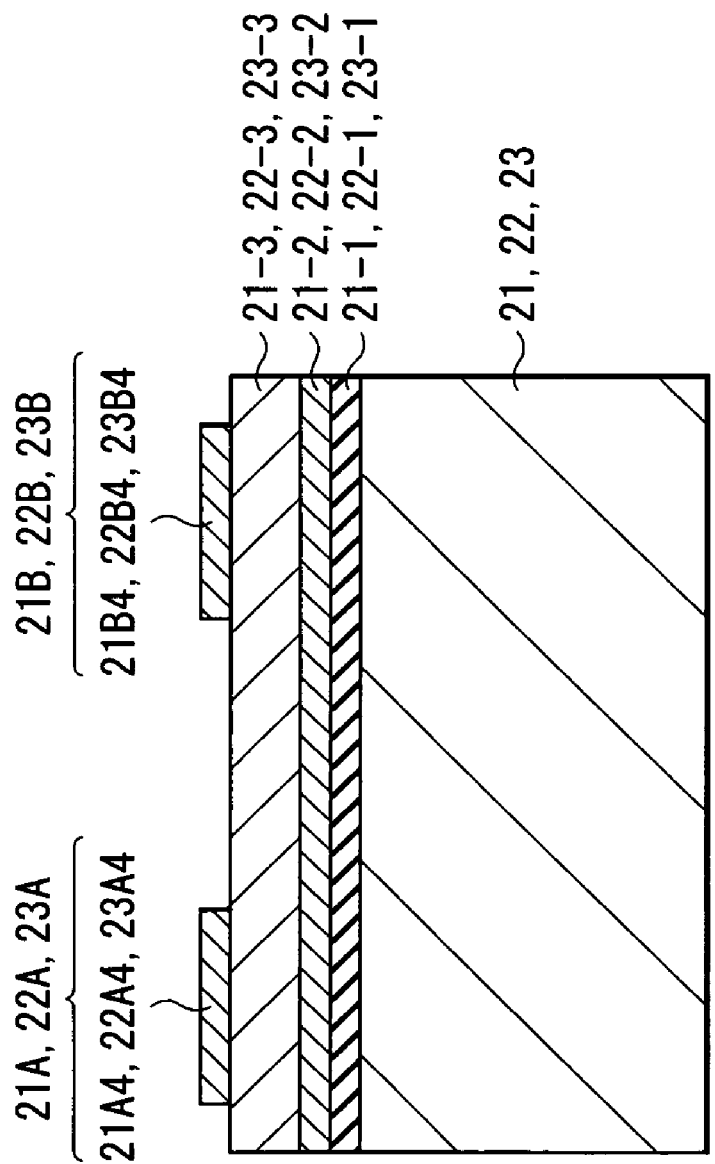
FIG. 5 is a cross sectional view for explaining the modification of FIG. 4.

As shown in FIG. 5, it is also possible that the insulating layers 21A1, 22A1 and 23A1, and the insulating layers 21B1, 22B1 and 23B1 are formed by using common insulating layers 21-1, 22-1 and 23-1 respectively, for example. The lower electrodes 21A2, 22A2 and 23A2, the lower electrodes 21 B-2, 22 B-2 and 23 B-2 may also be formed by using common lower electrodes 21-2, 22-2 and 23-2 respectively, for example. The piezoelectric crystal 21A3, 22A3 and 23A3, and the piezoelectric crystal 21B3, 22B3 and 23B3 may also be formed by using common piezoelectric crystals 21-3, 22-3 and 23-3 respectively, for example.

Herein, the insulating layers 21A1, 22A1, 23A1, 21B1, 22B1, 23B1, 21-1, 22-1 and 23-1 are typically formed by layering a $ZrO_2$ film and a $Y_2O_3$ film in order. The lower electrodes 21A2, 22A2, 23A2, 21B2, 22B2, 23B2, 21-2, 22-2 and 23-2 are typically made of a Pt (100) orientation film. The piezoelectric crystals 21A3, 22A3, 23A3, 21B3, 22B3, 23B3, 21-3, 22-3 and 23-3 are typically formed including lead zirconate titanate (PZT). The upper part electrodes 21A4, 22A4, 23A4, 21B4, 22B4 and 23B4 are typically made of a Pt (100) orientation film.

Figure 6:
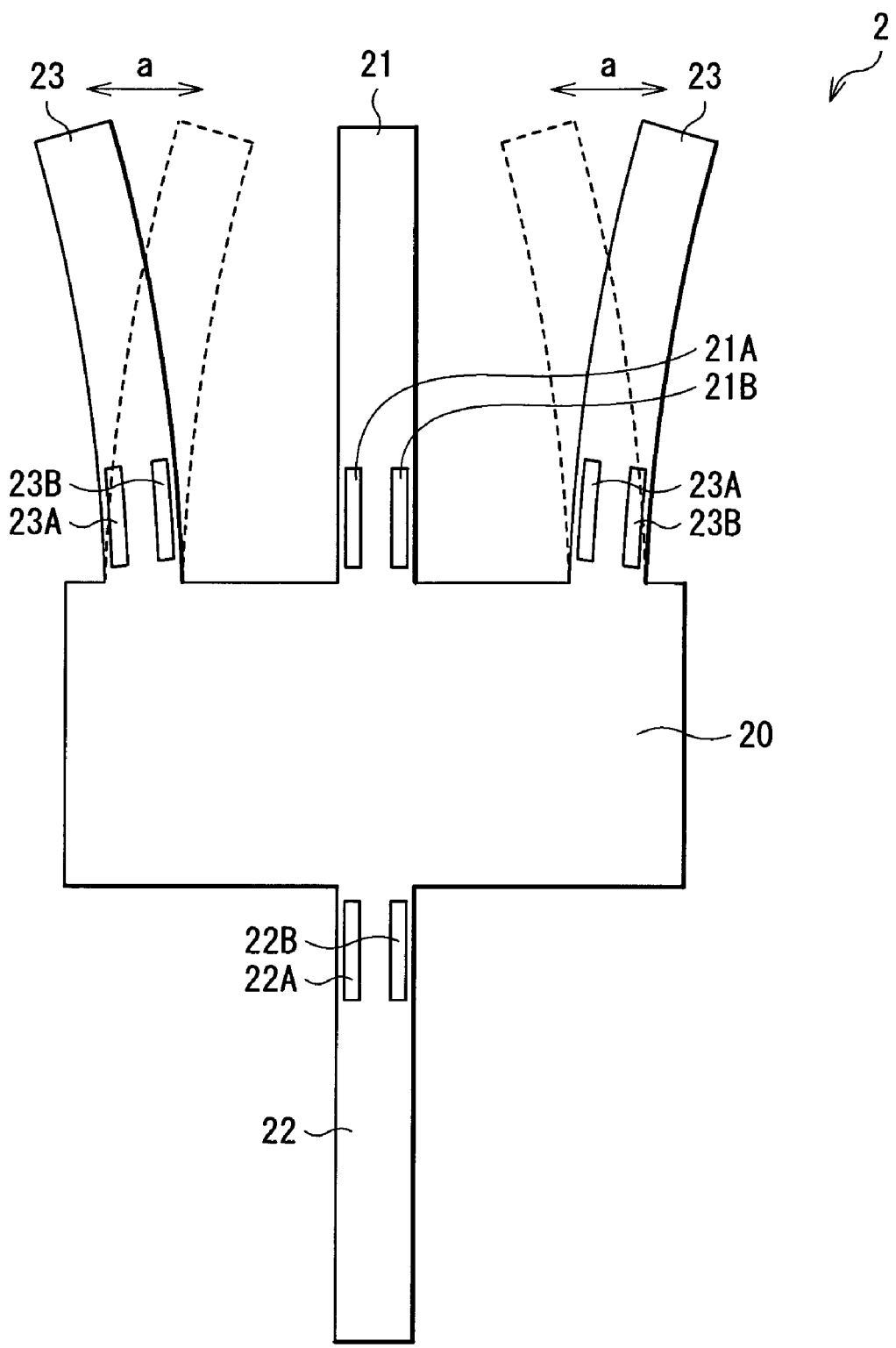
FIG. 6 is a simplified top surface block diagram for explaining an operation of an angular velocity sensor of FIG. 1 when rotational motion is not applied thereto.

As for the angular velocity sensing device 1 with such arrangement, when the pair of upper drive arms 23 are driven using the piezoelectric elements 23A and 23B in a case where an object equipped with the angular velocity sensing device 1 is not rotated, for example, the pair of upper drive arms 23 vibrate almost in a direction "a" that is orthogonal to the extending direction of the upper drive arms 23, as shown in FIG. 6 in which a partially-omitted configuration of the angular velocity sensor 2 is illustrated.

Figure 7:
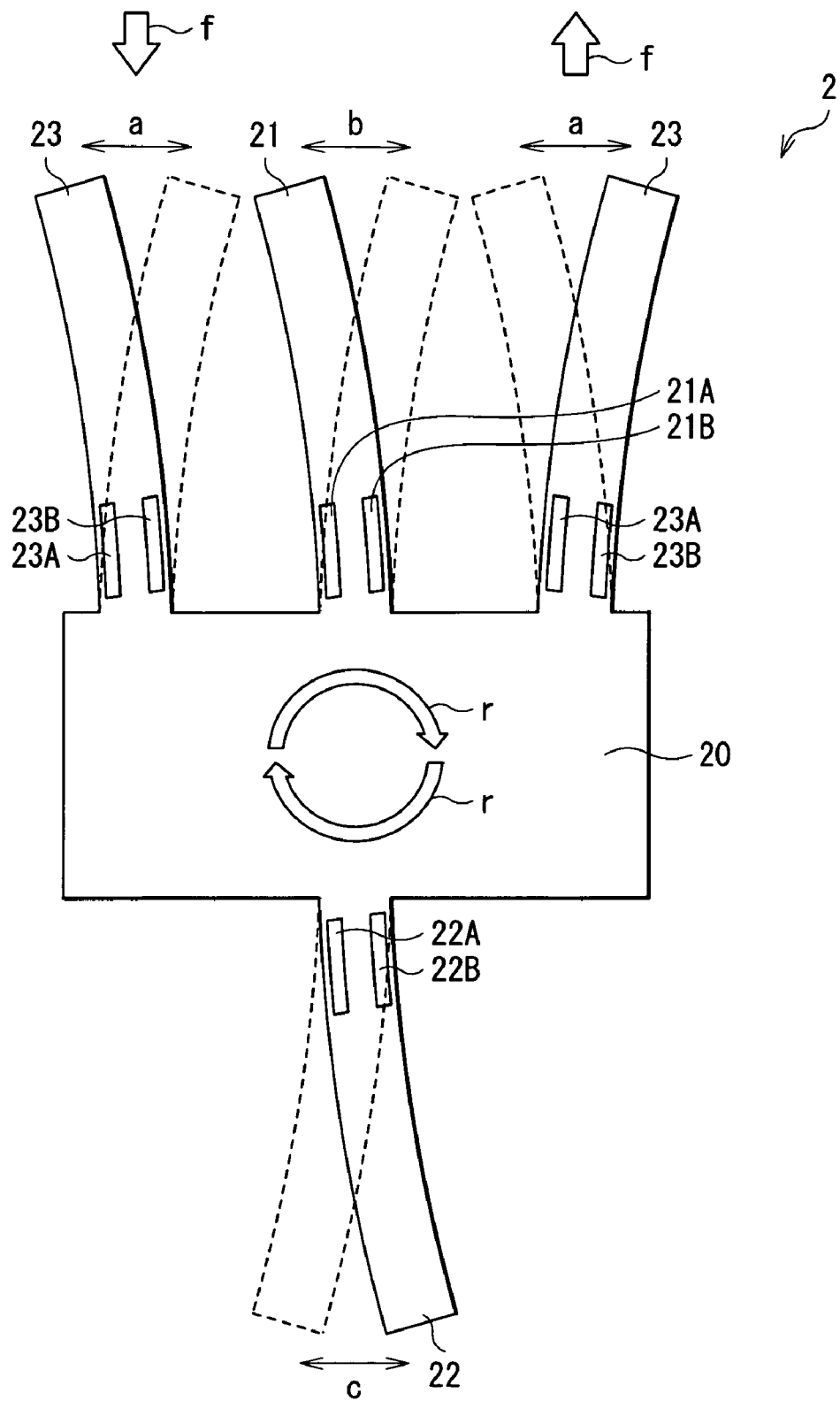
FIG. 7 is a simplified top surface block diagram for explaining an operation of the angular velocity sensor of FIG. 1 when the rotational motion is applied thereto.

Then, in a chase where the object equipped with the angular velocity sensing device 1 starts a rotational motion r about a rotation axis extending in a direction orthogonal to the hypothetical plane including the sensor element supporting portion 41 for example, the Coriolis force f acts on the pair of upper drive arms 23 in a direction opposite to each other, and each of the upper detection arm 21 and the lower detection arm 22 starts an asymmetrical right and left vibration motion in a direction "b" orthogonal to the extending direction of the upper detection arm 21 and in a direction "c" orthogonal to the extending direction of the lower detection arm 22 respectively, as shown in FIG. 7. Accordingly, a detection signal can be obtained from the piezoelectric elements 21A and 21B in accordance with the vibration of the upper detection arm 21 while a detection signal can be obtained from the piezoelectric elements 22A and 22B in accordance with the vibration of the lower detection arm 22, thereby detecting an angular velocity thereof.

Figure 8:
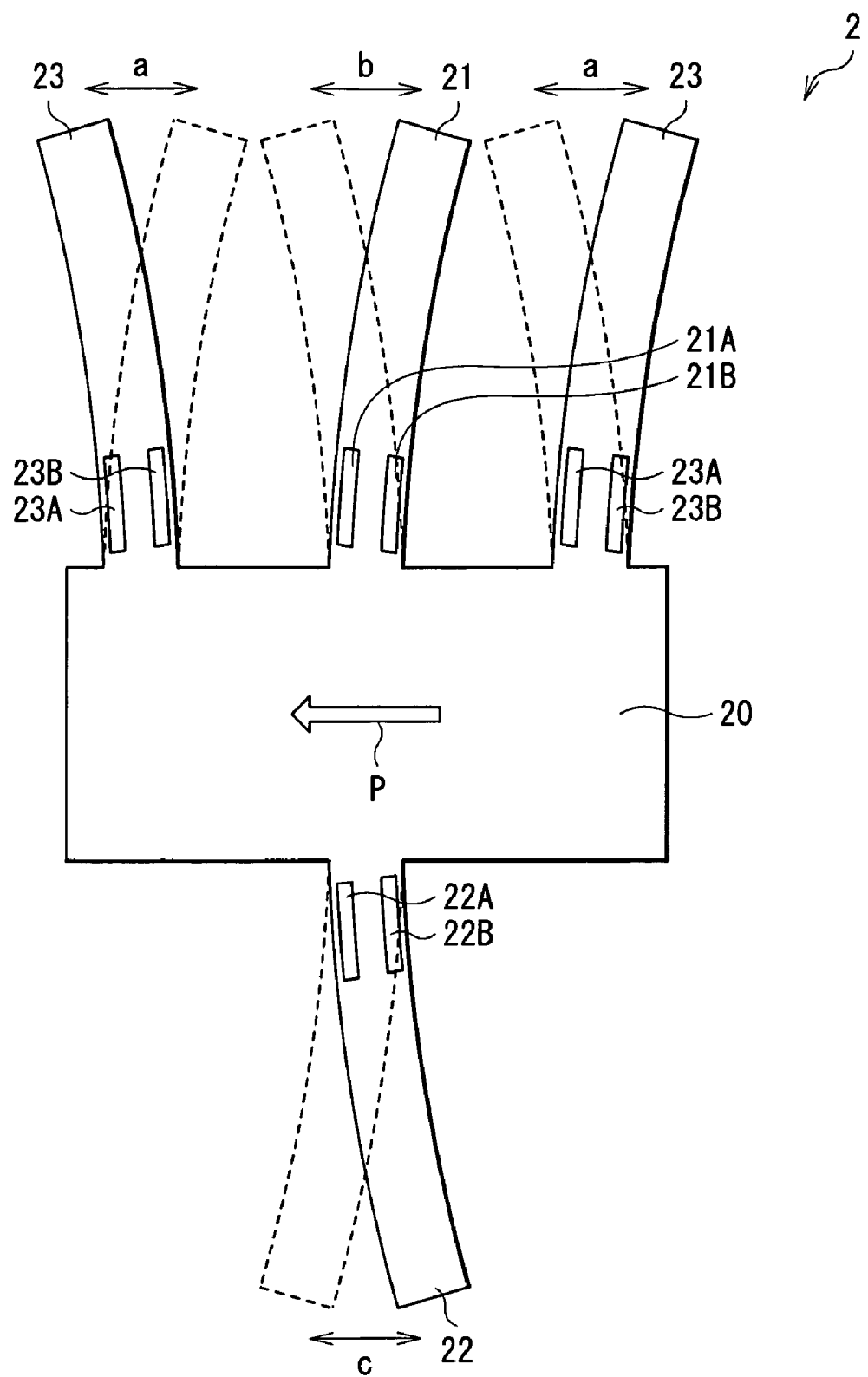
FIG. 8 is a simplified top surface block diagram for explaining the operation of the angular velocity sensor of FIG. 1 when acceleration is applied thereto from a lateral direction thereof.

By the way, since the lower detection arm 22 extends on a side opposite to that of the upper detection arm 21 and the pair of upper drive arms 23 according to the present embodiment, in the case where an acceleration p is applied from a lateral direction as shown in FIG. 8 when the angular velocity is detected as mentioned above, or when the object equipped with the angular velocity sensing device 1 is stopped or making a uniform movement, the upper detection arm 21 and the lower detection arm 22 are displaced in a mutually same direction, thereby causing an in-phase vibration to both of them, in the direction "b" orthogonal to the extending direction of the upper detection arm 21 and in the direction "c" orthogonal to the extending direction of the lower detection arm 22 respectively. Accordingly, output of vibration caused by the acceleration applied from the lateral direction can be cancelled out by determining a difference in detection signals between the piezoelectric elements 21A and 21B and the piezoelectric elements 22A and 22B, to reduce a noise generation. Thus, the present embodiment can, even as a horizontally located type, discriminate the Coriolis-based vibration from the vibration caused by the lateral directional acceleration, thereby becoming scarcely affected by the lateral directional acceleration.

In addition, according to the present embodiment, the greatest moment is obtainable from the Coriolis force when the upper drive arms 23 are configured to extend in a direction parallel to each other, thereby further improving the detecting accuracy of the angular velocity.

When the upper drive arms 23 are configured to extend symmetrically with respect to the upper detection arm 21, symmetrical drive vibrations are generated therebetween more easily. As a result, it becomes possible to simplify a configuration of a drive circuit for driving each of the upper drive arms 23, and also to reduce a generation of unnecessary vibrations of the upper detection arm 21 and the lower detection arm 22.

In addition, when the upper detection arm 21 and the lower detection arm 22 are configured to extend symmetrically with respect to a linear symmetry axis passing through the fixed center section 20A and extending in a width direction of the upper detection arm 21, the vibration caused by the lateral directional acceleration can be easily discriminated from the angular-velocity-based vibration, thereby improving the detecting accuracy of the angular velocity.

To easily remove the lateral directional acceleration, the upper detection arm 21 and the lower detection arm 22 should preferably have the same amplitude and resonance frequency with each other. In this manner, vibrations excited by the acceleration applied from the lateral direction are canceled more efficiently, thereby being removed more easily. In order to easily remove the acceleration applied from the lateral direction, it is also preferred that the upper drive arms 23 have the same amplitude and resonance frequency with each other.

Figure 9:
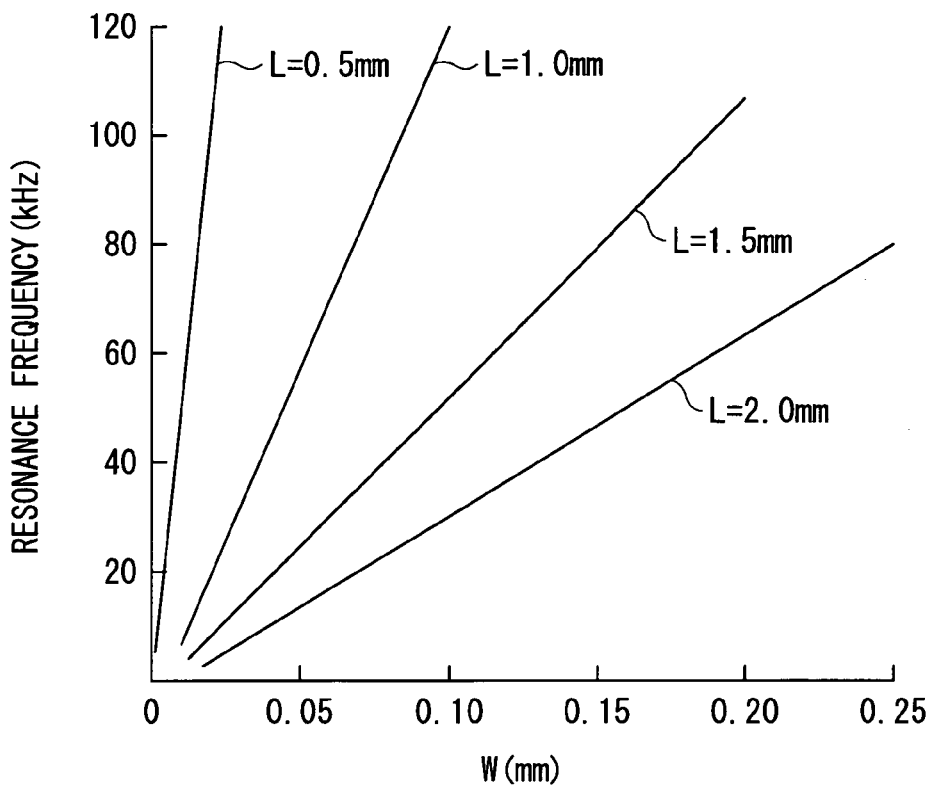
FIG. 9 is a related view for explaining a relationship between the width and the resonance frequency.
Figure 10:
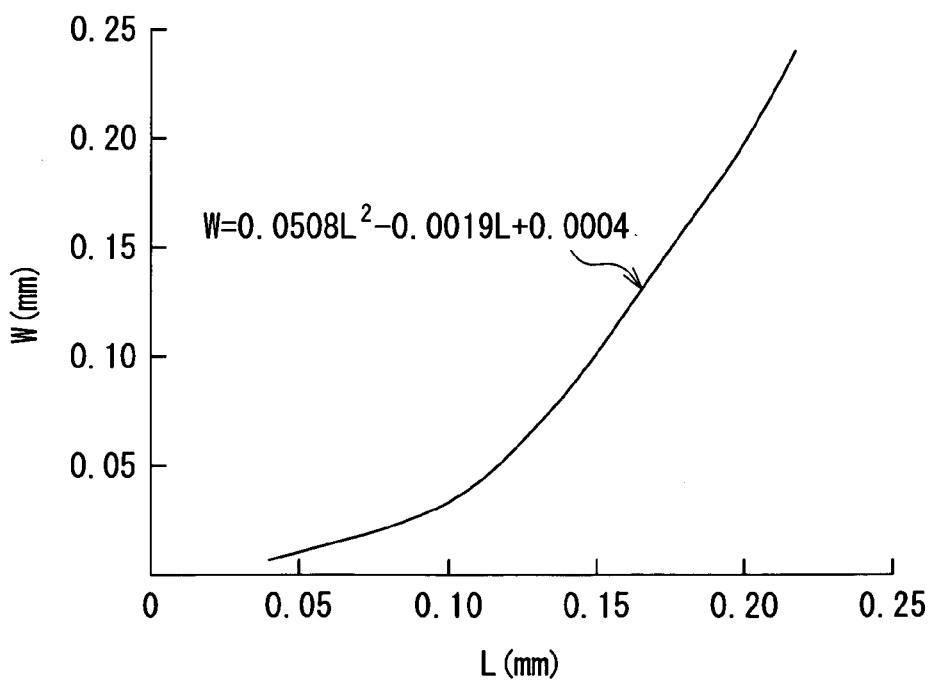
FIG. 10 is a related view for explaining a relationship between the length and the width.

Specifically, as shown in FIG. 9, the resonance frequency and the amplitude are adjustable by changing the width W of the vibrating portions (a width W1 of the upper detection arm 21, a width W2 of the lower detection arm 22, a width W3 of one of the pair of upper drive arms 23, and a width W4 of the other of the pair of upper drive arms 23 as shown in FIG. 3), or by changing the length L (a length L1 of the upper detection arm 21, a length L2 of the lower detection arm 22, a length L3 of one of the pair of upper drive arms 23, and a length L4 of the other of the pair of upper drive arms 23 as shown in FIG. 3). Thus it is desirable that the amplitudes and resonance frequencies should be the same between the upper detection arm 21 and the lower detection arm 22, or between the pair of upper drive arms 23. That will be attainable by, for example, adjusting the relationship between the width W and the length L in such a manner as shown in FIG. 10. In this case, it is most preferred that the upper detection arm 21 and the lower detection arm 22 are configured symmetrically with respect to the fixed portion 20, and the pair of upper drive arms (腕ぬけ) 23 are configured symmetrically with respect to the upper detection arm 21. Such symmetrical configuration allows them to have the same vibrations with each other, thereby capable of reducing the noise most easily.

In addition, the fixed portion 20 according to the present embodiment has only four vibration arms (namely, the upper detection arm 21, the lower detection arm 22 and the pair of upper drive arms 23), which can reduce the number of the vibration arms by two compared with those configured symmetrically between the upper/lower portions as disclosed in Japanese Patent No. 3694160 or in Japanese Unexamined Patent Application Publication No. 2005-106481, thereby improving the yields throughout the manufacturing process.

In addition, according to the present embodiment, since only the lower detection arm 22 is connected to the fixed portion 20 on a side thereof opposite to the side connected to the upper detection arm 21 and the pair of upper drive arms 23, and the angular velocity sensor 2 is configured asymmetrically between the upper/lower portions, a symmetrical configuration between the upper/lower portions is are unnecessary as disclosed in Japanese Patent No. 3694160 or Japanese Unexamined Patent Application Publication No. 2005-106481, etc. Accordingly, it is not necessary to make the upper detection arm 21 and the lower detection arm 22 have the same shape and size with each other, thereby compact-sized angular velocity sensor 2 is available just by reducing the length of the lower detection arm 22.

First Modification

Figure 11:
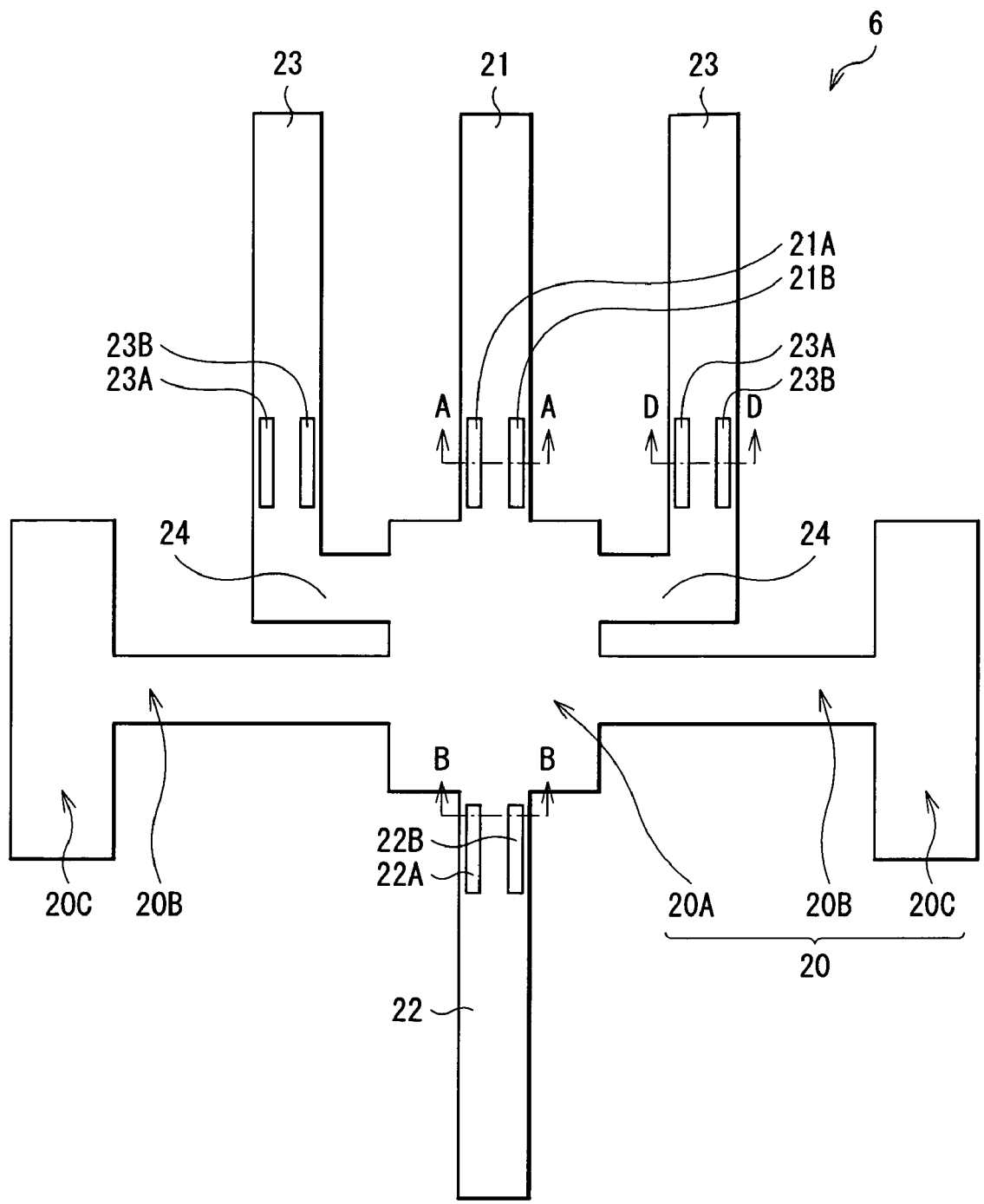
FIG. 11 is a top surface block diagram of an angular velocity sensor according to a first modification.

According to the above-mentioned embodiment, the pair of upper drive arms 23 are directly connected to the fixed portion 20, but may be connected to a fixed portion 20 indirectly via a pair of connection arms 24 as shown in FIG. 11.

The connection arm 24 is typically connected to the fixed center sections 20A on a side connecting to neither of the upper detection arm 21 or the lower detection arm 22 (the right and left sides of the fixed center section 20A in FIG. 3), and is extending along the plane parallel to a top surface of the sensor element supporting portion 41, and is also extending in a direction orthogonal to the extending direction of the upper drive arm 23. Herein, the connection arm 24 is typically formed of a material common to that of the upper detection arm 21, the lower detection arm 22 and the pair of upper drive arms 23 (such as silicon for example), and can be produced in bulk formation by patterning a wafer.

An angular velocity sensor 6 according to the present modification, since the pair of upper drive arms 23 are connected to the fixed portion 20 via the pair of connection arms 24, the generated Coriolis force can be applied as a greater moment to the pair of upper drive arms 23 when the Coriolis force is generated. Accordingly, vibrations of the upper detection arm 21 and the lower detection arm 22 can be made with a relatively large amplitude. As a result, that will improve the detecting accuracy of the angular velocity.

Figure 12:
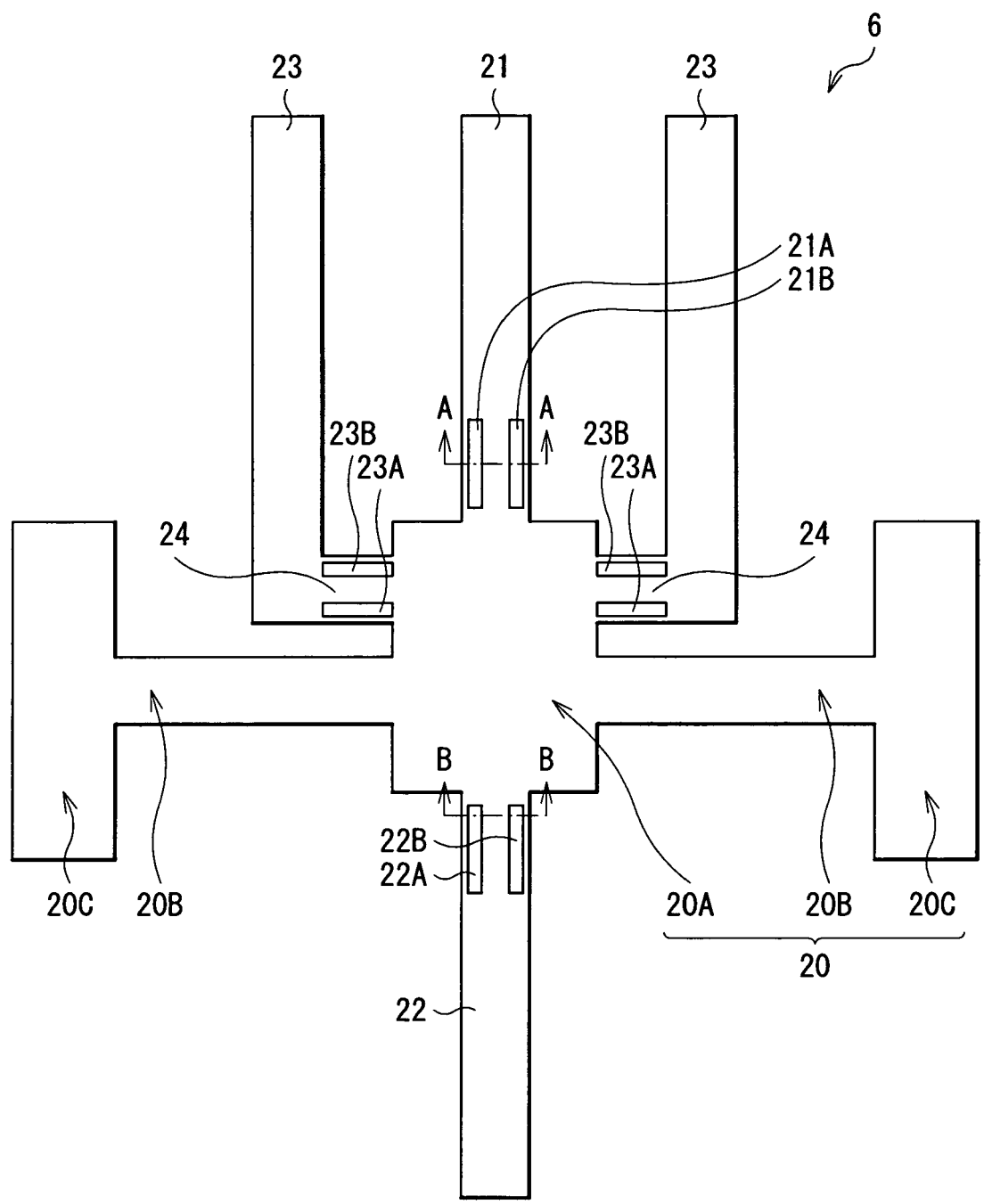
FIG. 12 is a top surface block diagram showing an example of the angular velocity sensor of FIG. 11.

Alternatively, the pair of piezoelectric elements 23A and 23B as the second and third upper electrodes may be disposed on the face of the connection arm 24 instead of the upper drive arms 23, as shown in FIG. 12.

Second Modification

Figure 13:
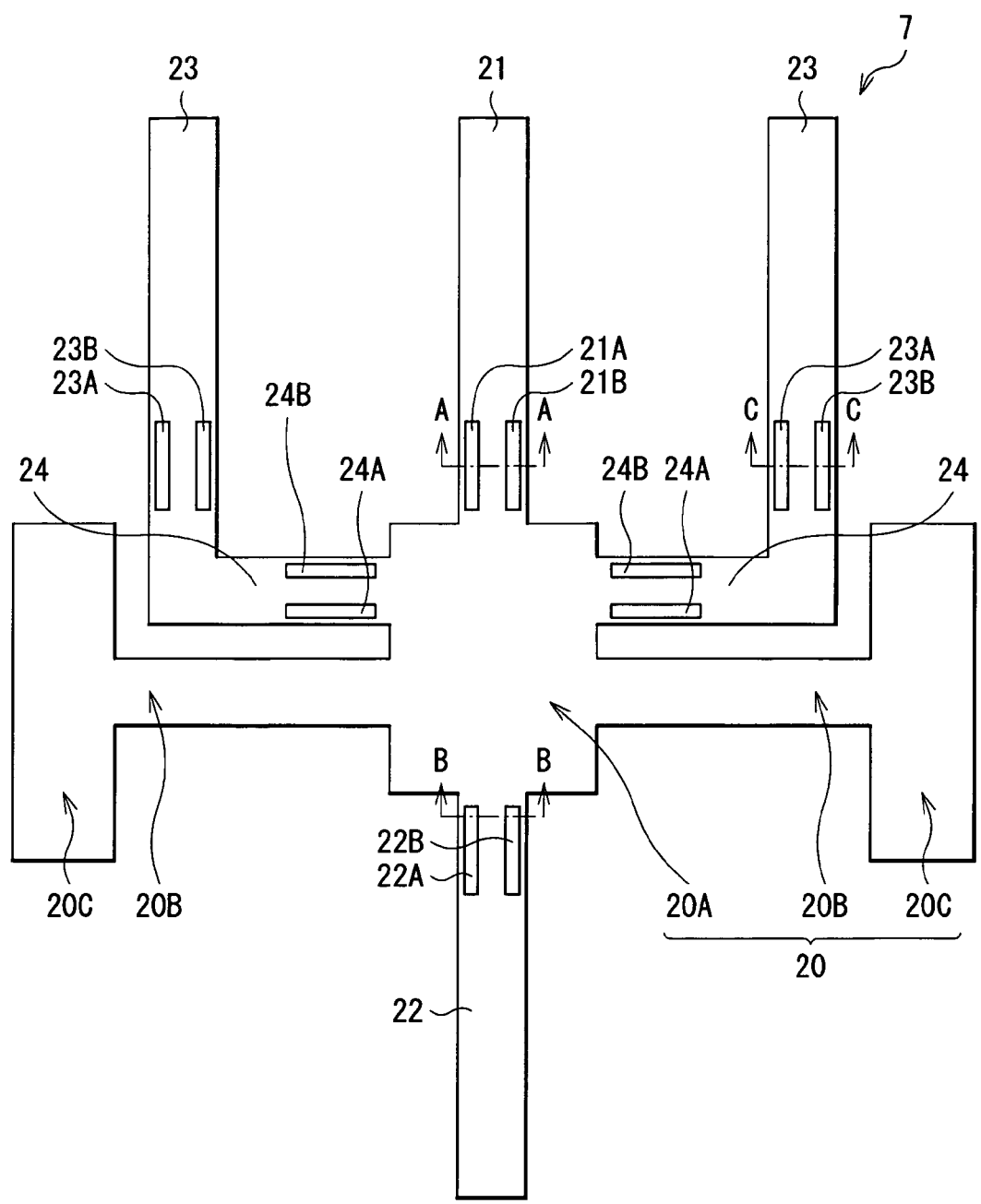
FIG. 13 is a top surface block diagram showing an angular velocity sensor according to a second modification.

According to the above-mentioned first modification, the pair of upper drive arms 23 are connected to the fixed portion 20 via the pair of connection arms 24, and the pair of piezoelectric elements 23A and 23B are provided on the upper drive arms 23. However, as shown in FIG. 13, a pair of piezoelectric elements 24A and 24B (fourth and fifth upper electrodes) may be additionally disposed on the surface of each of the pair of connection arms 24 in such a manner as to extend in a direction parallel to the extending direction of each of the pair of connection arms 24. The foregoing pair of piezoelectric elements 24A and 24B have a function of detecting vibrations of the pair of connection arms 24 when they vibrate along the plane parallel to the top surface of the sensor element supporting portion 41 of the casing 4, and are preferably arranged side by side along a width direction of each of the connection arms 24.

Herein, the piezoelectric elements 24A and 24B are typically formed by layering an insulating layer, a lower electrode, a piezoelectric crystal, and an upper part electrode in this order on the connection arm 24. The piezoelectric element 24A and the piezoelectric element 24B may be formed integrally, or may be formed separately.

In an angular velocity sensor 7 according to the present modification, since the pair of piezoelectric elements 24A and 24B each extending in a direction parallel to each of the connection arms 24 are disposed upon the surface thereof, in the case where any acceleration is applied from a longitudinal direction when the angular velocity is detected as mentioned above, or when the object equipped with the angular velocity sensing device 1 is stopped or making a uniform movement, the connection arms 24 are displaced in a mutually same direction, thereby causing an in-phase vibration to both of them. Accordingly, direction and magnitude of the acceleration applied from the longitudinal direction is detectable using the above-mentioned situation. Accordingly, even if the vibration amplitude in the upper detection arm 21 and the lower detection arm 22 is affected and changed by the vibration generated in each of the connection arms 24 due to the longitudinally-applied acceleration, Coriolis-based vibrations can be discriminated from vibrations generated due to the acceleration applied from the longitudinal direction with use of the detection signal which is obtainable from the piezoelectric elements 24A and 24B disposed upon each of the connection arms 24. As a result, influence of the acceleration from the longitudinal direction can be approximately removed.

Figure 14:
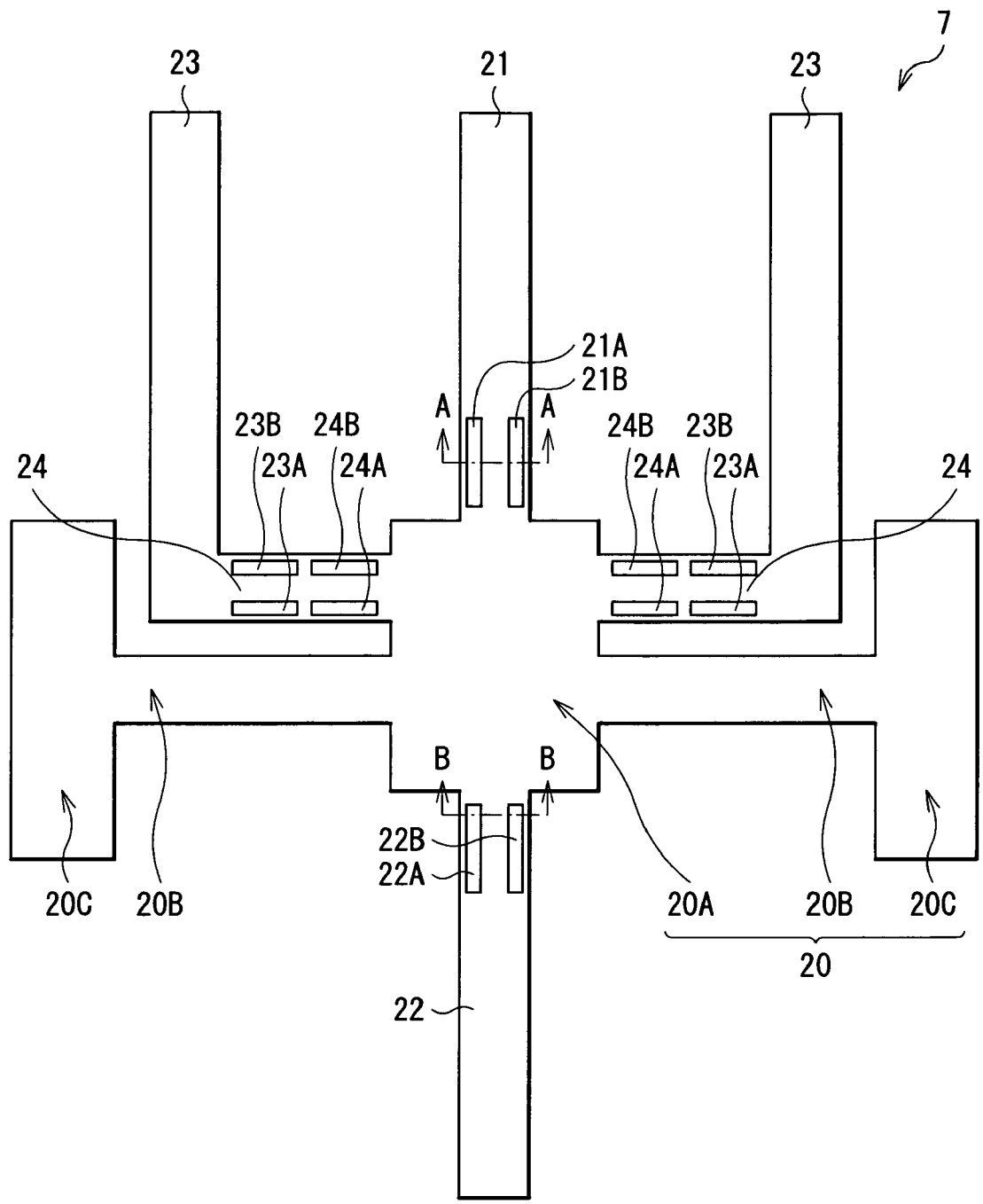
FIG. 14 is a top surface block diagram showing an example of the angular velocity sensor of FIG. 13.

Alternatively, the pair of piezoelectric elements 23A and 23B may be disposed upon the surface of each of the connection arms 24 together with the piezoelectric elements 24A and 24B, as shown in FIG. 14.

Although the present invention has been described above with reference to the embodiments and modifications, the invention is not limited to the embodiments and so on but can be variously modified.

Obviously many modifications and variations of the present invention are possible in the light of the above teachings. It is therefore to be understood that within the scope of the appended claims the invention may be practiced otherwise than as specifically described.

What is claimed is:

1. An angular velocity sensor comprising:
   a fixed portion fixed to a support surface, the fixed portion including a fixed center section, a pair of fixed beam sections, and a pair of fixed end portions,
   a first upper vibration arm connected to one side of the fixed portion and extending along a plane parallel to the support surface,
   a lower vibration arm connected to the other side of the fixed portion and extending along the plane parallel to the support surface,
   a second upper vibration arm and a third upper vibration arm each directly or indirectly connected to the fixed portion in such a manner as to form a pair of arms with the first upper vibration arm in between, and extending along the plane parallel to the support surface in the same direction where the first upper vibration arm extends,
   a pair of connection arms connected to the fixed portion and extending along the plane parallel to the support surface,
   a pair of first upper electrodes formed on the first upper vibration arm to be arranged side by side along a width direction of the first upper vibration arm,
   a pair of lower electrodes formed on the lower vibration arm to be arranged side by side along a width direction of the lower vibration arm,
   a pair of second upper electrodes formed on the second upper vibration arm to be arranged side by side along a width direction of the second upper vibration arm, and
   a pair of third upper electrodes formed on the third upper vibration arm to be arranged side by side along a width direction of the third upper vibration arm, wherein
   the second upper vibration arm is indirectly connected to the fixed portion via one of the pair of connection arms,
   the third upper vibration arm is indirectly connected to the fixed portion via the other of the pair of connection arms,
   the first, second, and third upper vibration arms and the lower vibration arm extend in directions parallel to each other,
   the second upper vibration arm and the third upper vibration arm extend symmetrically with respect to the first upper vibration arm,
   each of the pair of fixed beam sections is connected to an opposing side of the fixed center section, and
   each of the pair of fixed end portions is connected to an end of one of the pair of fixed beam sections.

2. An angular velocity sensing apparatus comprising an angular velocity sensor and an integrated circuit element, the angular velocity sensor including:
   a fixed portion fixed to a support surface, the fixed portion including a fixed center section, a pair of fixed beam sections, and a pair of fixed end portions,
   a first upper vibration arm connected to one side of the fixed portion and extending along a plane parallel to the support surface,
   a lower vibration arm connected to the other side of the fixed portion and extending along the plane parallel to the support surface,
   a second upper vibration arm and a third upper vibration arm each directly or indirectly connected to the fixed portion in such a manner as to form a pair of arms with the first upper vibration arm in between, and extending along the plane parallel to the support surface in the same direction where the first upper vibration arm extends,
   a pair of connection arms connected to the fixed portion and extending along the plane parallel to the support surface,
   a pair of first upper electrodes formed on the first upper vibration arm to be arranged side by side along a width direction of the first upper vibration arm,
   a pair of lower electrodes formed on the lower vibration arm to be arranged side by side along a width direction of the lower vibration arm,
   a pair of second upper electrodes formed on the second upper vibration arm to be arranged side by side along a width direction of the second upper vibration arm, and
   a pair of third upper electrodes formed on the third upper vibration arm to be arranged side by side along a width direction of the third upper vibration arm, wherein
   the integrated circuit element transmits a driving signal to the second and third upper vibration arms, and receives a detection signal outputted from the first upper vibration arm and the lower vibration arm,
   the second upper vibration arm is indirectly connected to the fixed portion via one of the pair of connection arms,
   the third upper vibration arm is indirectly connected to the fixed portion via the other of the pair of connection arms,
   the first to third upper vibration arms and the lower vibration arm extend in directions parallel to each other, the second upper vibration arm and the third upper vibration arm extend symmetrically with respect to the first upper vibration arm, each of the pair of fixed beam sections is connected to an opposing side of the fixed center section, and each of the pair of fixed end portions is connected to an end of one of the pair of fixed beam sections.

* * * * *